United States Patent [19]

Pollock

[11] Patent Number: 5,238,407
[45] Date of Patent: Aug. 24, 1993

[54] BLOCKS WITH MATING BOSSES AND RECESSES WHICH BULGE FOR INTERFERENCE FIT

[76] Inventor: Clyde Pollock, 2375 Sueno Way, Fremont, Calif. 94539

[21] Appl. No.: 604,930

[22] Filed: Oct. 29, 1990

Related U.S. Application Data

[62] Division of Ser. No. 550,085, Jul. 9, 1990.

[51] Int. Cl.$^5$ .................. G09B 19/02; G09B 1/00
[52] U.S. Cl. .................... 434/195; 434/208; 434/403; 446/117; 446/121; 446/87
[58] Field of Search .............. 434/208, 403, 195; 446/87, 117, 124, 125, 128, 120, 121

[56] References Cited

U.S. PATENT DOCUMENTS

| | | | |
|---|---|---|---|
| 349,646 | 9/1886 | Grigg | 434/208 X |
| 1,305,724 | 6/1919 | Kennedy | 434/195 |
| 2,278,894 | 4/1942 | Paulson | 446/117 |
| 2,440,205 | 4/1948 | McLain | 434/167 |
| 3,577,671 | 5/1971 | Woollett | 446/124 |

FOREIGN PATENT DOCUMENTS

| | | | |
|---|---|---|---|
| 2162458 | 6/1973 | Fed. Rep. of Germany | 446/124 |
| 2920743 | 12/1980 | Fed. Rep. of Germany | 446/124 |
| 1174646 | 3/1959 | France | 434/208 |
| 2239084 | 3/1974 | France | 446/125 |
| 171389 | 10/1982 | Netherlands | 446/124 |
| 14957 | 8/1894 | United Kingdom | 446/87 |

*Primary Examiner*—John J. Wilson
*Assistant Examiner*—L. Thomas
*Attorney, Agent, or Firm*—David Pressman

[57] ABSTRACT

Base-ten blocks for teaching arithmetic to children, in which each block (19) has a projecting boss (27) with curved (bowed-out) sides (29) and an aperture (33) with straight sides (35), so that blocks (19) can be securely joined together to form multiples of units. Integrally made rows (37) of ten blocks each have two end bosses (41) for joining to other rows (37) to make flats (47) of one hundred units. Each flat has four bosses (51) for joining to other flats (47) to make a cube of one thousand units. The blocks have one color for units, a different color for rows of tens, a different color for flats of one hundred, and a still different color for cubes of one thousand. The blocks can be used to teach addition, multiplication, subtraction, division, etc., to children.

13 Claims, 4 Drawing Sheets

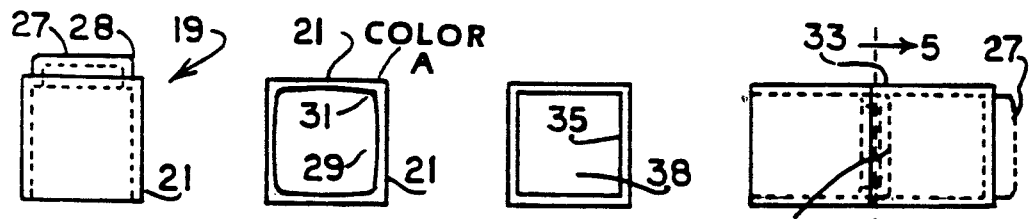
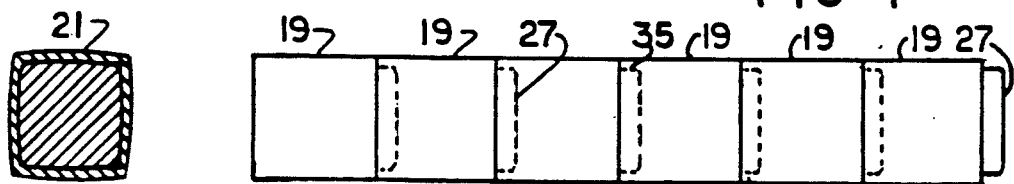
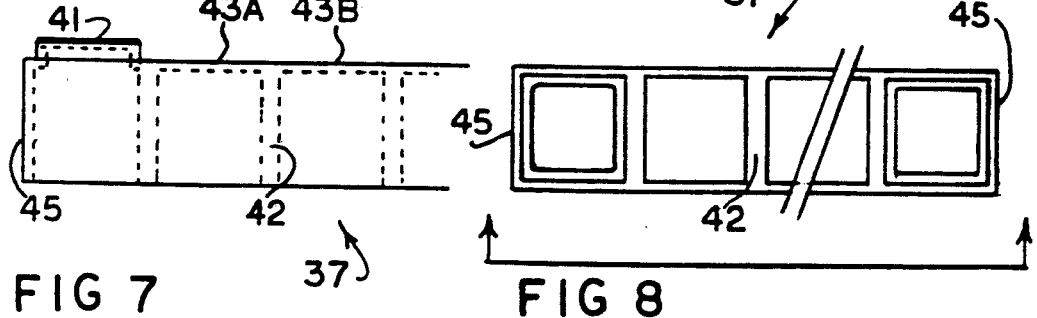
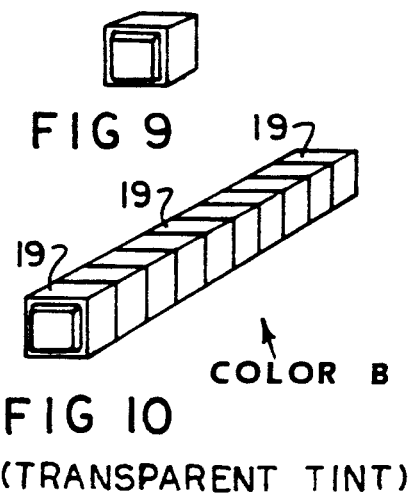
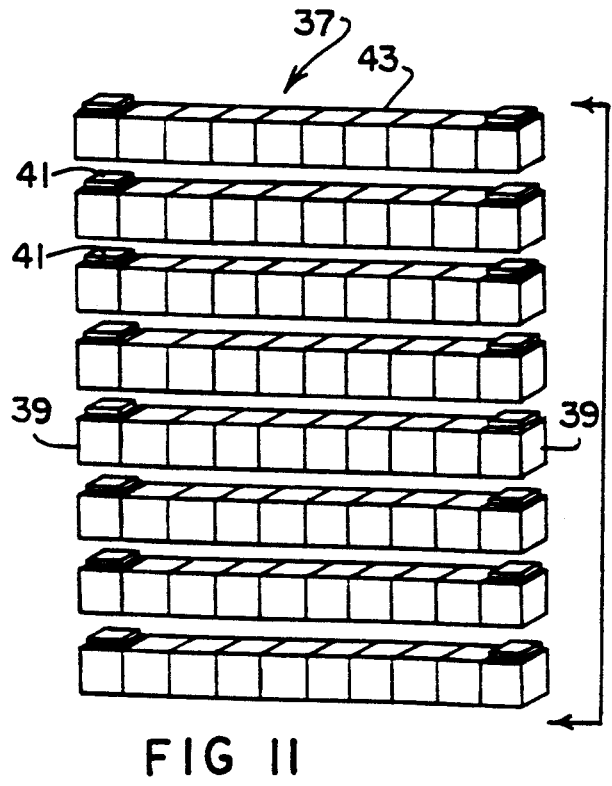

BLOCKS WITH MATING BOSSES AND RECESSES WHICH BULGE FOR INTERFERENCE FIT

This application is a division of Ser. No. 07/550,085 which was filed Jul. 9, 1990 and remains pending at issue.

BACKGROUND—FIELD OF INVENTION

The present invention relates to a learning aid, in particular to blocks which can be joined to teach arithmetic to children.

BACKGROUND—DESCRIPTION OF PRIOR ART

In the past, various blocks were used for teaching arithmetic to young children. These blocks were sometimes supplied in multiples of ten and as such were called decimal or base-ten blocks. (Learning the base ten system is of extreme importance nowadays because virtually all computer systems are designed around such a system). The blocks were joinable in rows, flats, arrays, cubes etc. The blocks included mating bosses and recesses and other joining means for holding the blocks together so that the child using them could be taught to add, subtract etc., by joining and removing the blocks in such rows, arrays, etc. However, these joining means left much to be desired: they soon wore or came apart easily. This resulted in the blocks frequently falling apart. The children using the blocks thus became frustrated and thus switched their minds from concentrating and learning to reassembling the blocks. Frequently the reassembled blocks fell apart again, further frustrating the child and sometimes reducing the child to tears.

This produced a number of unwanted effects. First the frustrated child lost concentration and missed part of the teacher's instruction. Second, if other children were present, e.g., in a class, they began to notice the frustrated child and became concerned and lost concentration also. This caused the teaching eposode to become a shambles.

An additional problem with a base-ten blocks was the difficulty in distinguishing between those blocks representing tens, hundred, and thousands. This was a serious drawback and handicapped effective teaching and learning, especially where children were concerned.

An additional complicating factor occurred because some blocks were made in different colors, with the colors being jumbled. I.e., individual blocks were made in many colors. While a profusion of colors on a single block might excite and interest a child, such colors detracted from the child's ability to concentrate. Furthermore the blocks had no means for teaching arithmetic.

Some examples of blocks made of rubber plastic or other suitable material, designed to teach arithmetic to young children, are as follows:

E. E. Tompkins, in U.S. Pat. No. 1,971,545, dated Aug. 28, 1934, shows toy building blocks made of rubber. These, however, fall far short of being suitable for teaching arithmetic because the blocks are imitations of clay bricks and half bricks (bats), such that although a child might learn basic bricklaying with them, they are unsuited for teaching base-ten arithmetic.

P. La Grutta, in U.S. Pat. No. 2,972,833, dated Feb. 28, 1961, shows a plastic block assembly. However these blocks are again suitable only for building and not for teaching arithmetic.

A French patent No. 1,263,113, dated 1961, to Est. Vulliermes, shows interlocking blocks with numbers attached for teaching arithmetic to children. However these blocks do not use or teach the base-ten system.

H. W. and E. E. Morgan, in U.S. Pat. No. 3,094,792, dated Jun. 25, 1963, shows blocks with holes therethrough for assemblying onto pegs to show tangible examples of arithmetic to children. However again no reference is made to the base-ten system. Also different colors are suggested for each different unit from one to ten, which tends to confuse a child attempting to learn the base-ten system.

K. Zysset, in U.S. Pat. No. 3,398,493, dated Mar. 24, 1966, shows a building block toy set. However, again no reference is made to the base-ten blocks, or to teaching arithmetic to children.

H. E. Stassen, in U.S. Pat. No. 3,414,986, dated Dec. 10, 1968, shows a visual aid for arithmetic. Gov. Stassen's system is similar to that of French patent, i.e., numbers are placed on blocks representing the number of units involved. Again this system differs from and is unsuitable for teaching the base-ten system.

H. Hasel et al., in U.S. Pat. No. 3,566,531, dated Mar. 2, 1971, shows mating blocks having beaded studs and resilient sidewalls. These building blocks have four mating projections at each half-block end, corresponding to each half-block end of an adjacent block. These projections fit into indents on the inside of the resilient sides of the adjacent block for the purpose of block building. These blocks are similar to those of the Tomkins patent and are merely models of clay building bricks. While they can be used to teach various bricklaying techniques, they make no reference to and are not suitable for the base-ten system.

Glassman, in U.S. Pat. No. 3,776,667, dated Oct. 23, 1973, shows an educational arithmetic manipulative toy. It employs blocks which have holes drilled in them to fit over pegs attached to other blocks. Again no reference is made to and these blocks are not suitable for the base-ten system.

Y. Chatani, in U.S. Pat. No. 4,305,221, dated Dec. 15, 1981, shows block members having interior interlocking means for use by children in toy block construction. Again these blocks are similar to those of Hasel and Tomkins. They provide a model of clay building bricks, perhaps useful in teaching bricklaying, but again no reference is made to any base-ten blocks system for teaching arithmetic.

J. H. Walker, in U.S. Pat. No. 744,850, dated 1956, shows blocks for the education and recreation of children. The blocks have a hole therethrough for passing a cord, if desired. A projection is also provided to fit into a recess in a hollow or solid adjacent cube. No mention is made for any use in base-ten block system.

As stated, none of the references above show base-ten block for teaching arithmetic to young children. Moreover none have any effective reliable means for holding the blocks together and allowing them to be separated repeatedly. Also none provide any means to facilitate understanding the base-ten system. Also when previous blocks were mated, there was a lack of harmony between single units and integral combinations of units in mixed assemblies of the blocks. I.e., end blocks in multiple rows or arrays of mated blocks often overlapped or did not align properly. Lastly, no means was provided for distinguishing between blocks representing, units, tens, hundred, and thousands.

OBJECTS AND ADVANTAGES

Accordingly one object and advantage of the present invention is to provide a set of base-ten blocks which fit firmly together and do not fall apart. Other objects are to provide a set of such blocks which can be repeatedly separated and joined without failure, which do not cause children using them frustration and loss of concentration while learning, and which facilitates learning and distinguishing the units, tens, hundreds, and thousands in the base-ten system. Further objects are to provide blocks in colors which will assist in teaching arithmetic in a clear and understandable way to children, to provide a set of such blocks which will snap together in any desired arrangement, and to provide a set of blocks which align when assembled in rows, arrays, etc. Additional objects and advantages are to facilitate teaching children arithmetic, to make it enjoyable, and to provide a comfortable climate where the children's class will stay united in learning. Still further objects and advantages will become apparent from a consideration of the ensuring description, taken in conjunction with the accompanying drawings.

BRIEF DESCRIPTION OF DRAWINGS

FIG. 1 is a side view of a single block in accordance with the invention.

FIG. 2 is a top view of the block of FIG. 1.

FIG. 3 is a bottom view of the block of FIG. 1.

FIG. 4 is a side view of two blocks interlocked together.

FIG. 5 is a sectional view taken along line 5—5 of FIG. 4.

FIG. 6 is a side view of six blocks interlocked together.

FIG. 7 is a side view of a portion of an integral ten-unit row of blocks.

FIG. 8 is a top view of the ten-unit row.

FIG. 9 is a perspective view of a single block.

FIG. 10 is a perspective view of a ten unit row.

FIG. 11 is a perspective exploded view of ten rows.

REFERENCE NUMERALS

Figure 12:
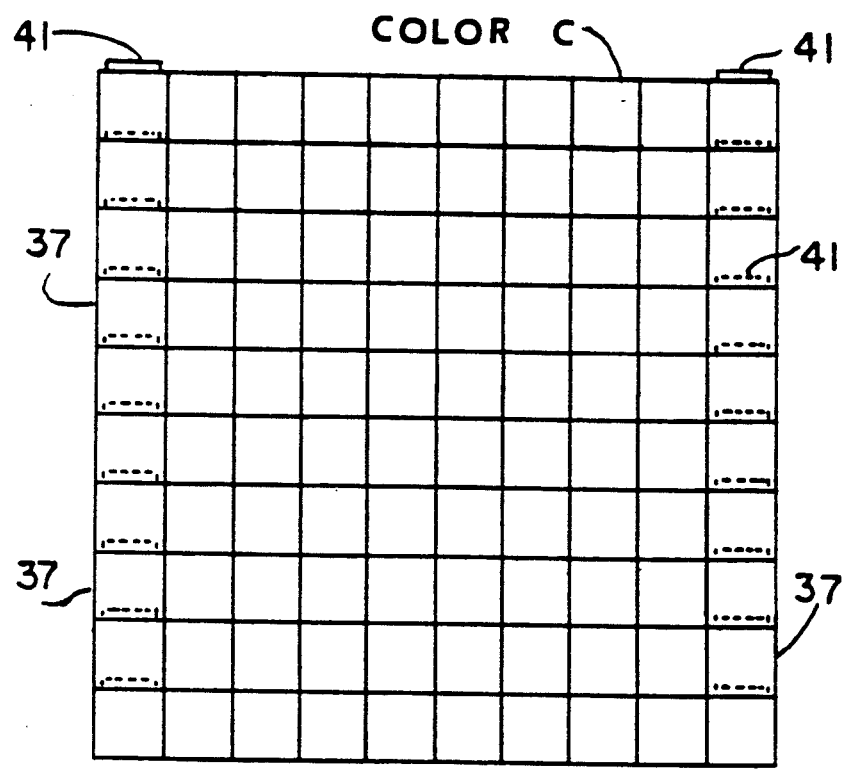
FIG. 12 is a side view of ten rows assembled to form a flat.

19—single blocks
21—side
27—boss
28—lead-in edge
29—curved side
31—corners
33—recess
35—straight sides
37—row
39—end units
41—boss
42—thick wall
43A and 43B—integral units
45—end wall
47—flat
49—corner units
53—1000 block cube

DETAILED DESCRIPTION OF SINGLE BLOCK—FIGS. 1-6

FIG. 1 shows a side view of a single block 19 used in the base-ten block or cube system of my invention. Block 19 has four sides 21, each of which measures 1 cm (0.375") by 1 cm square (FIGS. 1-6, 9, and 10). An integral boss or projection 27 extends up from the top of the block. Boss 27 is 8 mm (0.312") wide, 8 mm (0.312") deep and 2 mm (0.125") high, about 1/5 the height of the block, and has slightly curved (bowed-out) sides 29 and rounded lead-in edges 28. Sides 29 bow out about 0.5 mm (0.0312"). Boss 27 also has rounded corners 31 (FIG. 2).

When in use, boss 27 is inserted into open end or recess aperture 33 (FIG. 4) in the bottom of an identical block. Sides 35 of open end 33 are straight, as shown clearly in FIG. 3. Thus when boss 27, is inserted into straight sided recess 33, sides 29 and 35 will each distort to the total of both distortions (about 0.5 mm), as shown in the sectional view (FIG. 5). This forced distortion forms a vise-like force or interference grip between recess 33 and boss 27 so as to hold the adjacent mated blocks (top to bottom) firmly together. This is because the vise-like grip occurs on all sides of each connection. When a plurality of blocks 19 are joined together (top boss 27 of each being plugged into bottom recess 33 of the next), a row of blocks will be created, as shown in FIGS. 6 and 10. The cubes or blocks of the row will not fall apart during normal handling due to the aforedescribed grip.

Rounded lead-in edges 28 (FIG. 1) of boss 27 facilitate the insertion of boss 27 (with bowed sides 29) into recess 33 (with straight sides 35).

When inserted, bowed sides 29 will distort sides 35, which is made of suitable deformable plastic, or any other suitable material. As the deformation of sides 35 is the means for holding the blocks together when assembled, pressure is required during insertion. However this pressure is easily accomplished by any child old enough to learn arithmetic by the base-ten system.

Single blocks (FIG. 1) preferably are made transparent with a colored tint of a first or "A" color as indicated in FIG. 2. The "A;" color may, e.g., be blue, for reasons to be described. The blocks preferably are made of plastic which is slightly deformable.

TEN UNIT ROWS—FIGS. 7, 8, AND 11

Side wall 21 of each of blocks 19 (FIGS. 1-6 and 9) is 2 mm thick. However, when placed side by side with other block, the combined thickness of two such walls 35 is 4 mm. When a plurality of blocks are molded or glued together side-to-side as shown in FIG. 7, a preassembled wall will be provided. The wall between adjacent blocks is made of a double or 4 mm thickness. However each end wall is made with a single, or 2 mm, thickness. This will prevent jamming or misalignment problems when two rows, placed end-to-end (not shown) are mated with a single, longer pre-assembled row. Also, it will prevent misalignment when a single block 19 (FIG. 1) is plugged into the end block of a row 37 (FIG. 7).

When a row of blocks is molded as shown at 37 (FIGS. 7 or 11), each representing ten units, only the end blocks have a boss 41 and a corrosponding bottom recess (not shown). The wall thickness between integral or glued blocks 43A and 43B, shown clearly in FIGS. 7 and 8, is twice the thickness of a unit wall, i.e., 2×2=4 mm. However, as stated, the end wall 45, (FIGS. 7, 8 and 11) remains at half this, or a 2 mm thickness.

100-UNIT FLATS—FIG. 13

A flat 47 (FIG. 13) is an integrally molded combination of ten rows 37 (FIG. 12). However, only the four corner blocks 49 have bosses 41 and corrosponding recesses (not shown). Again, the wall thickness between adjacent blocks in any row (horizontal or vertical) is twice the wall thickness of the end walls of that row.

1,000-UNIT CUBE—FIG. 16

Figure 14:
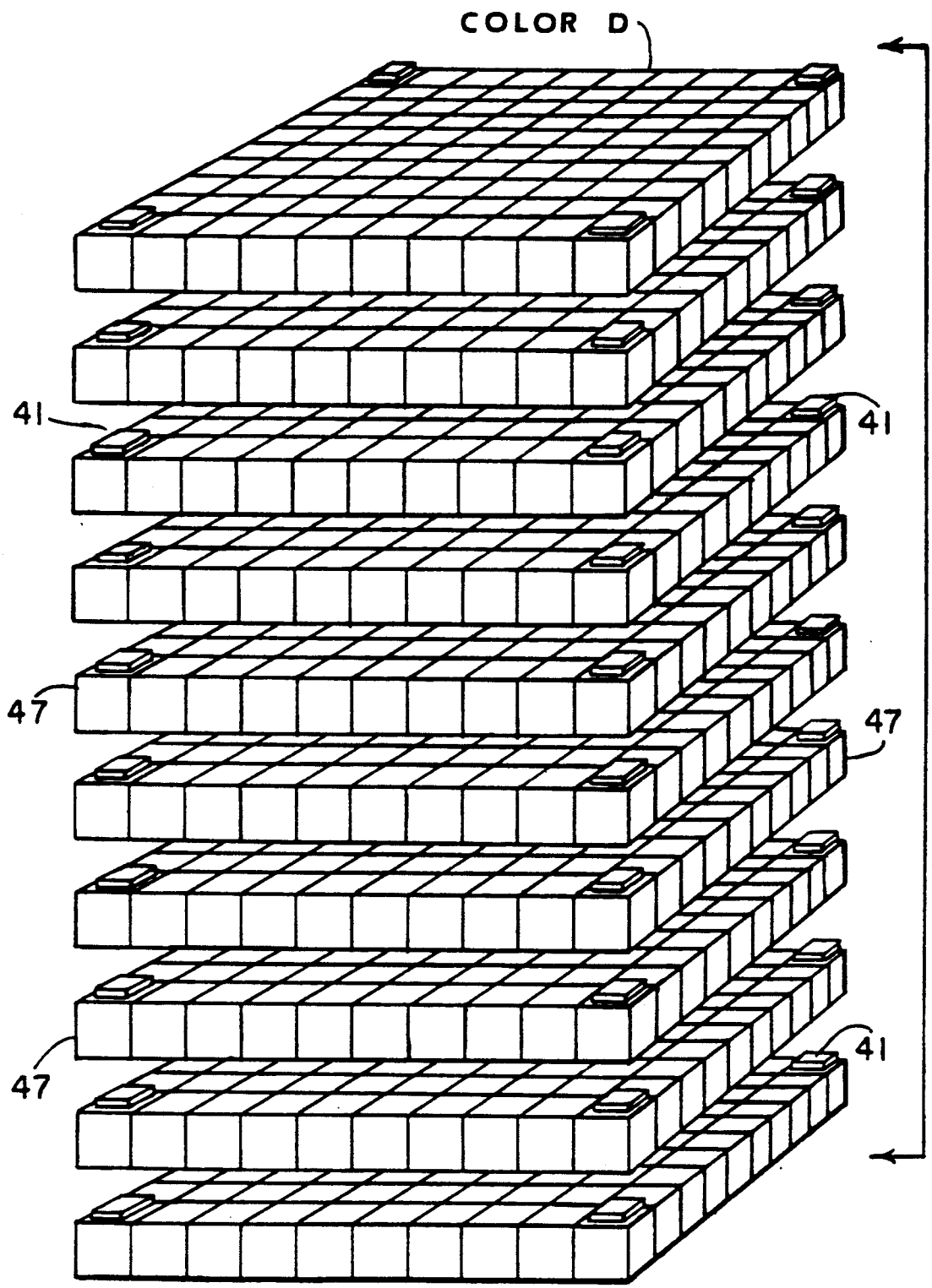
FIG. 14 is a perspective exploded view of ten flats.
Figure 15:
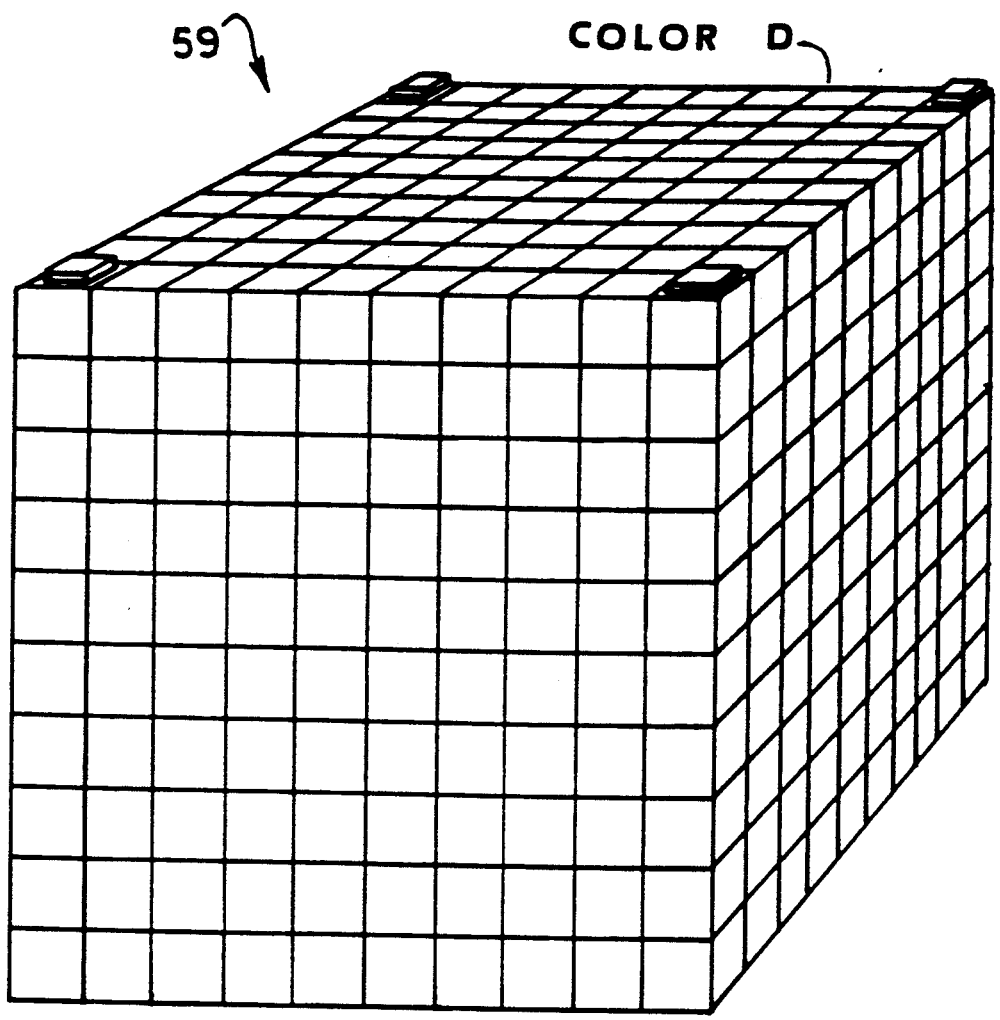
FIG. 15 is a perspective view of ten flats forming a 1000-cube array.

When the ten flats 47 (FIG. 14) are assembled face-to-face as shown in FIG. 15, a 1,000 unit cube 53 is formed.

COLORS OF BLOCKS

Single blocks 19 (FIG. 1) and rows 37 (FIG. 11) preferably are made of transparent plastic tinted different colors, e.g. blue and red (designated "A" and "B" colors in FIGS. 1 and 10).

Flats of 100 blocks (FIG. 12) are made transparent but with a different or "C" tint, e.g. green, light blue, etc. as indicated in FIG. 12. And cubes of 1000 clocks (FIG. 15) are transparent with a still different or "D" tint, e.g. purple, as indicated.

OPERATION—FIGS. 1-6, 9, AND 10

A child is especially aware of differences in color, and learns colors at home and in pre-school classes. Children enjoy connecting colors to various objects. Children feel happy to connect something they already know with something they are learning, and they thus soon becomes comfortable with the colored blocks.

In operation, the child is taught to assemble units or blocks 19 end to end (FIG. 10) until ten are assembled. This elementary operation can be used to teach the child to count. The child can easily be taught to assemble ten blocks by adding blocks to the row until its length equals that of a preassembled row 37 (FIG. 11).

Figure 13:
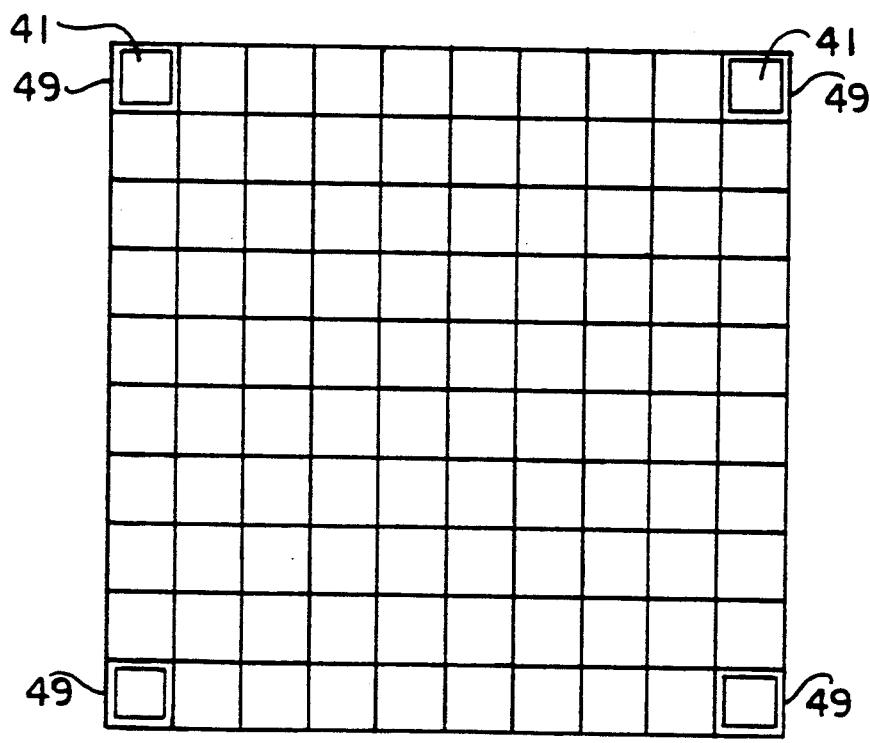
FIG. 13 is a top view of a "flat" (100 blocks).

Once the child has learned to count to 10 and assemble a row of ten blocks, he or she can exchange it for preassembled roe 37, which has the same value (ten). The row has a different color from the individual blocks so that the child can readily be taught to multiply or add (as well as divide or subtract) by associating multiples of one color with a single unit of another color, e.g. "ten blues equal one red," etc. This enables the child to become familiar with the decimal or base-ten system. Then the child is taught to assemble ten rows 37 (FIG. 11) together, to assemble a flat (not shown) of 100 blocks. The child can be taught to recognize and count to 100 by comparison with preassembled flat 47 (FIG. 13). At the same time the child can be taught basic multiplication and subtraction by visualizing that ten strips of ten equal 100 ($10 \times 10 = 100$ and subtracting rows, e.g., $100 - 10 = 90$.

Once the child assembles a flat of 100 blocks, he or she can exchange it for preassembled flat 47 (FIG. 13) which has the same value. Again, each row of ten should have a different color than the flat, so that the child can learn the multiple color association, e.g. "ten reds equal one green" or "one hundred blues equal one green," etc.

Then the child is taught in the same manner as before, to assemble ten flats 47 (FIG. 15) to provide an assembled cube; this can then be exchanged for a preassembled cube (FIG. 16), which has the same value (1000 units). Thus the child's knoledge will now have been expanded to understand, count up to, add, and multiply up to 1000.

Each flat of 100 should have a different color from the cube, so that the child can learn the multiple association, e.g. "ten reds equal one purple."

As indicated this process enables the child to learn the fundamentals of the base-ten system, including the technique of multiplication $10 \times 1 = 10$, $10 \times 10 = 100$, $10 \times 100 = 1000$, etc. Also the child can be taught subtraction by comparison, take-away strategy, or noting differences, as well as addition by building-on, and division and multiplication by building arrays, etc. The color association and combinations greatly facilitate this process.

In addition, the transparency of the blocks and understanding by enabling the child to see through the color of foregoing (front to top) blocks to discern the color of rear blocks in any assembly and to easily visualize that additional single blocks, rows of blocks, or flats of blocks are joined behind the foregoing blocks to make up the numbered array.

SUMMARY, RAMIFICATIONS AND SCOPE

Thus the reader will see that I have provided a base-ten block system for teaching arithmetic to young children. This system has many advantages over prior art systems, These are: the boss is made with slightly curved sides, so that when inserted into the aperture at the opposite end of another unit which has straight sides, the mating walls will distort so that a very strong clamping force will hold both together. This grip will occur on all four sides between the boss of one block and the aperture of the adjoining unit. This ability to maintain pressure is due to the distortable property of the material used and its ability to remember its original shape (square with straight sides) and to return to that shape after the boss, (which has curved sides) is withdrawn.

The wall thickness of single blocks is 2 mm. However, where multiple blocks are molded integrally together, the wall thickness is increased to 4 mm, so as to correspond in length to multiple single blocks of the same number of units. This prevents jamming when single blocks are positioned adjacent rows, or when two rows are placed end-to-end.

Single blocks are made of one color, rows are made of a different color, flats are made of a third color, and cubes of a fourth color. This provides a valuable association and mnemonic aid during the teaching of arithmetic (addition, subtraction, etc.).

While the above description contains many specificities, the reader should not construe these limitations on the scope of the invention but merely as exemplifications of preferred embodiments thereof. Those skilled in the art will envision that many other possible variations are within its scope. For example skilled artisans will readily be able to change the materials, dimensions and sizes of the various embodiments, such as by making the parts of wood, metal, or rubber, making them larger, smaller, thicker or thinner, or with other colors. The boss can be made longer and its sides can be made with more or less curvature. The blocks can be made opaque, or the boss and aperture can be made octagonal instead of the sides the boss bulging, the inside surfaces of the recess can be convex (bulging in toward the center apex of the block) and the boss sides flat, or both the side surfaces of the boss and recess can be made to bulge, or any combination of the two can be used. While this system has been designed and is very instructive to children, it can also be used to teach arithmetic to adult "innumerates", i.e., adults who are arithmerically illiterate. While the blocks have been shown as being assemblable in the base-ten system, they can be fabricated according to other numbering systems, such as the quintile, octal, hexadecimal, etc..

Accordingly the reader is requested to determine the scope of the invention by the appended claims and their legal equivalents, and not by the examples which have been given.

I claim:

1. A block which can be assembled with other similar blocks for teaching arithmetic and assembling arrays of such blocks, comprising:

a solid body of a partially deformable solid material, said solid body having at least male and female sides which face in first and second opposing directions, respectively, said solid body having an axis extending in said first and second directions, said male and female sides each having a mating portion, said mating portion of said female side comprising a recess, said recess defining a predetermined plane figure of geometry of the type which has at least three generally straight sides when said recess is seen in the direction of said axis, said sides of said figure of geometry comprising at least three surfaces which face in at least three different directions substantially normal to said axis, said mating portion of said male side comprising a projection, said projection defining said predetermined figure of geometry when said projection is seen in the direction of said axis, said figure of geometry comprising at least three side surfaces which face in at least three different directions substantially normal to said axis and opposite to said three different directions faced by said three side surfaces of said recess, respectively, each of said side surfaces of at least one of said mating portions bulging out slightly in a direction normal to said axis, such that (a) when seen in the direction of said axis, each of said side surfaces will bow away slightly from said respective straight sides of said figure of geometry, (b) the dimensions between said side surfaces of said projection, as measured in a plurality of directions normal to said axis, are slightly greater than the corresponding dimensions between said side surfaces of said recess, (c) when said solid body is mated with another similar solid body by inserting said projection of said one solid body into the recess of said other identical solid body, the mating side surfaces of said projection and said recess will be deformed slightly and interfere, and (d) when said projection of one solid body is mated with a recess of another solid body, said mated projection and recess will have a force fit which holds said mated solid bodies securely, at least one of said mating portions having a plurality of chamfered corners at the point thereof remotest from the opposing side of said solid body so as to facilitate entry of said projection into said recess when said solid bodies are mated.

2. The block of claim 1 wherein said side surfaces of said projection bulge out slightly.

3. The block of claim 1 wherein said side surfaces of said recess bulge out slightly.

4. The block of claim 1 wherein said solid body has six sides and is cubical in shape.

5. The block of claim 1 wherein said projection and said recess have four side surfaces arranged in a square configuration.

6. The block of claim 1 wherein said solid body has a height, as measured in the direction of said axis, which is about five times the height of said projection.

7. The block of claim 1, further including a second solid body, identical to said first-named solid body, thereby to provide a pair of mateable solid bodies.

8. The block of claim 1 wherein said solid body is transparent.

9. The block of claim 8 wherein said solid body is tinted to have a predetermined color.

10. The block of claim 1, further including nine additional solid bodies, identical to said first-named solid body, permanently joined to said first-named solid body to form a row of ten solid bodies, said row having an axis of elongation, said first-named solid body being positioned at one end of said row so as to be a first-end solid body, the solid body which is positioned at the other end of said row being a second end solid body, the axes of said end solid bodies being normal to said axis of elongation of said row, each of said solid bodies being hollow and having side walls, the thickness of the side wall between all adjacent pairs of solid bodies being double the thickness of the wall opposite ends of said row, whereby said row will have the same length as a row of individually joined, but separate solid bodies.

11. The row of ten solid bodies of claim 10 wherein said row is tinted to have a predetermined color.

12. The block of claim 1, further including ninety-nine additional solid bodies, identical to said first-named solid body, permanently joined to said first-named solid body to flat of one hundred solid bodies in ten rows of ten solid bodies each, said flat being parallel to a plane said first-named solid body being positioned at one corner of said flat so as to be a first-corner solid body, the three solid bodies which are positioned at the other three corners of said flat being a second to fourth corner solid bodies, the axes of said corner solid bodies being normal to said plane, each of said solid bodies being hollow and having side walls, the thickness of the side wall between all adjacent pairs of solid bodies being double the thickness of the walls at opposite ends of each row, whereby said rows will have the same length as a row of individually joined, but separable solid bodies.

13. The row of ten solid bodies of claim 12 wherein said flat is tinted to have a predetermined color.

* * * * *